US009299361B2

(12) United States Patent
Wu et al.

(10) Patent No.: US 9,299,361 B2
(45) Date of Patent: Mar. 29, 2016

(54) SIGNAL NOISE REDUCTION

(71) Applicant: Spreadtrum Communications (Shanghai) Co., Ltd., Shanghai (CN)

(72) Inventors: Sheng Wu, Shanghai (CN); Fuhuei Lin, Shanghai (CN); Jingming Xu, Shanghai (CN); Bin Jiang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 152 days.

(21) Appl. No.: 14/303,593

(22) Filed: Jun. 12, 2014

(65) Prior Publication Data

US 2015/0170667 A1 Jun. 18, 2015

(30) Foreign Application Priority Data

Dec. 12, 2013 (CN) .......................... 2013 1 0682971

(51) Int. Cl.
*H04B 15/00* (2006.01)
*G10L 21/0208* (2013.01)
*G10L 21/0232* (2013.01)

(52) U.S. Cl.
CPC ......... *G10L 21/0208* (2013.01); *G10L 21/0232* (2013.01)

(58) Field of Classification Search
CPC . G10L 21/0232; G10L 21/0208; G10K 11/16
USPC ...................................... 381/94.2, 94.1, 71.1
See application file for complete search history.

(56) References Cited

U.S. PATENT DOCUMENTS 9,031,259 B2 * 5/2015 Yamabe .............. G10L 21/0216 381/92

* cited by examiner

*Primary Examiner* — Paul S Kim
(74) *Attorney, Agent, or Firm* — Vierra Magen Marcus LLP

(57) ABSTRACT

Systems and methods for signal noise reduction. An input digital signal may be partitioned into a series of adjacent segments. The adjacent segments may be converted to a frequency domain representation. A particular spectral component of a particular segment may be compared to a related spectral component of a first segment adjacent the particular segment, and to a related spectral component of a second segment adjacent the particular segment. The particular spectral component may be modified upon a magnitude value of the particular spectral component satisfying at least one of a predetermined set of conditions.

20 Claims, 4 Drawing Sheets

SIGNAL NOISE REDUCTION

BACKGROUND

Since the discovery of electricity and the myriad number of inventions thereof that followed, the ability to record sound have captivated and fascinated people. From early days of using analog recording mediums to the invention of digital recordings, the application of recording sound has multiplied. Today, in the age of Internet and mobile phones, one use of digital recording is to digitize sound for the purpose of transmitting the digitized sound. Often, mobile devices and computers are used to record sounds. In many instances, the recording quality is inadequate due to noises and interferences.

SUMMARY

This Summary does not in any way limit the scope of the claimed subject matter.

In an aspect, a method for implementing signal noise reduction is disclosed. The method may include receiving an input digital signal that represents an audio signal. The method may further include parsing the input digital signal into a series of adjacent segments. The method may further include converting each of the adjacent segments to a frequency domain representation. The method may further include comparing a particular spectral component of a particular segment, of the series of adjacent segments, to a related spectral component of a first segment adjacent the particular segment, and to a related spectral component of a second segment adjacent the particular segment. The method may further include modifying the particular spectral component upon a magnitude value of the particular spectral component at least one of: exceeding a particular scaled magnitude value of the related spectral component of the first segment; and exceeding a particular scaled magnitude value of the related spectral component of the second segment.

In another aspect, a method for detecting signal noise is disclosed. The method may include receiving an input digital signal representing a segment of audio signals. The method may further include converting the input digital signal to a frequency domain representation, the frequency domain representation comprising a series of frames m each comprising n spectral magnitude values identified by a particular index k. The method may further include detecting a signal anomaly by determining whether a particular spectral magnitude value at a particular index of a particular frame satisfies at least one of a set conditions comprising a predetermined peaking condition, a predetermined step-up condition, and a predetermined step-down condition. The method may further include modifying the particular spectral magnitude value at the particular index of the particular frame upon the particular spectral magnitude value satisfying at least one of the set of conditions. The method may further include converting the frequency domain representation to an output digital signal.

In another aspect, a computing system is disclosed. The computing system may include a processing unit, and a system memory connected to the processing unit. The system memory may include instructions that, when executed by the processing unit, cause the processing unit to instantiate at least one module to implement signal noise reduction. The at least one module may be configured to receive an input digital signal that represents an audio signal. The at least one module may further be configured to partition the input digital signal into a series of adjacent segments. The at least one module may further be configured to map each of the adjacent segments to a frequency domain representation. The at least one module may further be configured to compare a particular spectral component of a particular segment, of the series of adjacent segments, to a related spectral component of a first segment adjacent the particular segment, and to a related spectral component of a second segment adjacent the particular segment. The at least one module may further be configured to modify the particular spectral component upon a magnitude value of the particular spectral component at least one of: exceeding a particular scaled magnitude value of the related spectral component of the first segment; and exceeding a particular scaled magnitude value of the related spectral component of the second segment.

DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

The present disclosure is generally directed towards signal noise reduction. Although described in the context of audio signals throughout, the various aspects of the present disclosure may be applicable to any scenario in which it is desirable to implement computationally inexpensive signal processing techniques to filter undesired signal noise, as opposed to attempting to address the issue of signal noise by optimizing physical aspects of a particular system such as, for example, physical connection/connector optimization, circuit architecture optimization, and others. Optimizing physical aspects of a particular system may be at least somewhat effective on an application-by-application, or case-by-case, basis. However, it may be difficult to address signal noise reduction across a broad spectrum by investing resources to optimize physical system aspects alone. Signal processing on the other hand is extensible, or portable, in the sense that a core noise reduction algorithm, such as described below, may generally be incorporated within any system to implement signal noise reduction, aside from modifications that may be necessary due to implementation-specific requirements in software or firmware.

Figure 1:
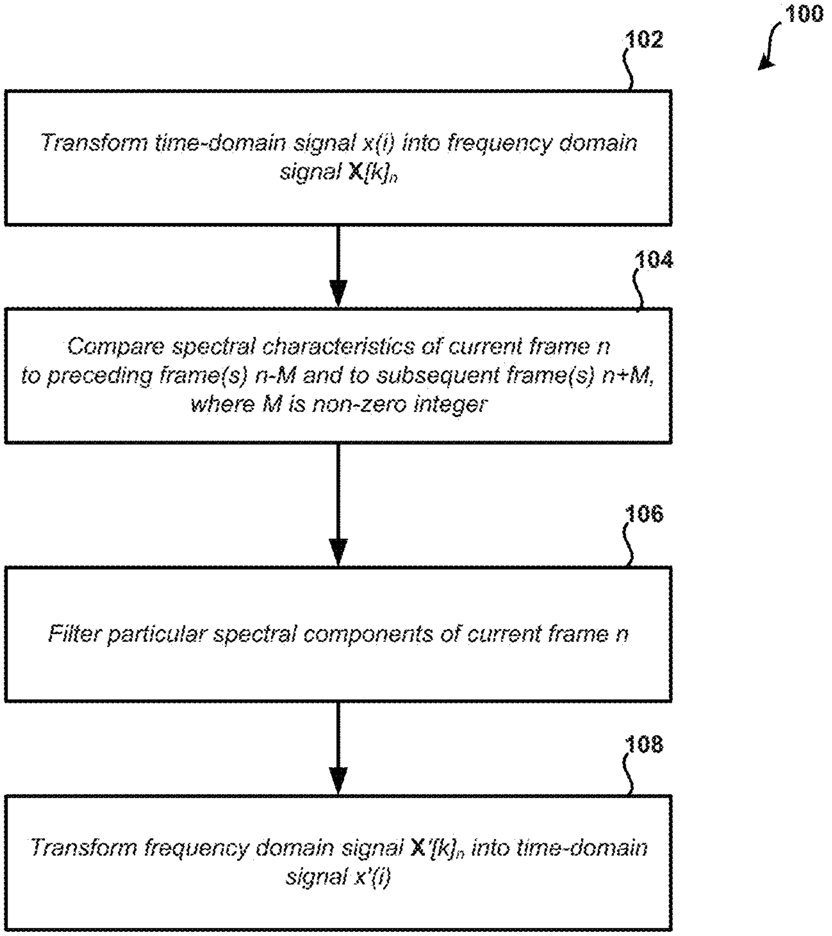
FIG. 1 shows an example method for implementing signal noise reduction in accordance with the present disclosure.

For example, referring now to FIG. 1, a method 100 for implementing signal noise reduction is shown in accordance with the present disclosure. In general, the example method 100 may be wholly or at least partially implemented by a special-purpose computing system or device, which itself may, in some embodiments, be configured based on implementation-specific requirements or specifications. An example of such a computing system or device is described in further detail below in connection with FIG. 4.

At operation 102, an input audio signal x(i), which may or may not be pulse-code modulated depending on implementation-specific requirements, having an interframe interval L composed of frame length N vector may be transformed into the frequency domain according to an example windowed DFT (Discrete Fourier Transform) function of the form:

$$X[k]_n = X_A[k]_n e^{jX_P[k]_n} = \sum_{l=0}^{N-1} x(nL+l)h(l)e^{-j\frac{2\pi}{N}lk}, \quad k = 0, 2, \ldots, N/2 \qquad \text{Equation 1}$$

While DFT is discussed throughout, other embodiments of frequency-domain transformation are possible such as, for example, DCT/iDCT (Discrete Cosine Transform/Inverse Discrete Cosine Transform), MDCT/iMDCT (Modified Discrete Cosine Transform/Inverse Modified Discrete Cosine Transform), and many others. Further, DFT, DCT, and/or MDCT may be mixed with a polyphase filter bank to obtain frequency-domain transformation. It is contemplated that any method for transforming a signal to/from a frequency-domain representation may be performed, and is within the scope of the present disclosure. Further, a particular method for transforming a signal to/from a frequency-domain representation may or may not be implementation-specific.

In this example, $X_A$ may correspond to a spectral amplitude, $X_P$ may correspond to a spectral phase frequency, and h[l] may correspond to an N-point window function that satisfies:

$$h[l]^2+h[N-1-l]^2=1, l=0,1, \ldots, N-L-1$$

$$h[l]=h[N-1-l]=1, l=N-L, \ldots, N/2-1 \qquad \text{Equation 2 and Equation 3}$$

In accordance with the present disclosure, the variable N may correspond to an even, non-zero integer value. Additionally, with $f_s$ understood to represent sampling frequency, and sampling ranges defined as [0.004 $f_s$, 0.01 $f_s$], when $f_s$=8000 Hz, N may be selected as integer value 64, and have a relationship with the interframe interval L of the form: N/2<=L<N.

At operation 104, in traversing a current frame n of spectral amplitude(s) within the frequency domain, along with a preceding frame n−1 of spectral amplitude(s), and a subsequent frame n+1 of spectral amplitude(s), a comparison of respective spectral amplitudes at a particular index value k (e.g., Equation 1) may be implemented to determine whether a signal anomaly such as, for example, high frequency transient noise, or so-called "clicking" noise, is present in the current frame n. Such an anomaly may be injected into a particular signal by many different types of mechanisms such as, for example, connection/disconnection of particular electrical equipment, electrical component switching, and many others.

In one embodiment, a signal anomaly may be determined to present in the current frame n upon satisfaction of at least one of the following conditions, presented in a mathematical form:

$$X_A[k]_{n-1}<\lambda_a X_A[k]_n \text{ and } \lambda_b X_A[k]_n>X_A[k]_{n+1} \qquad \text{Equation 4}$$

$$X_A[k]_{n-1}<\lambda_c X_A[k]_n \qquad \text{Equation 5}$$

$$X_A[k]_{n+1}<\lambda_d X_A[k]_n \qquad \text{Equation 6}$$

With reference to Equations 4-6, scalars $\lambda_a$, $\lambda_b$, $\lambda_c$, and $\lambda_d$ may have the following relationship(s): $0<\lambda_a$, $\lambda_b$, $<1$, $0<\lambda_c<\lambda_a$, and $0<\lambda_d<\lambda_b$; where, in one embodiment, $\lambda_a$, $=\lambda_b=0.5$, and $\lambda_c$, $=\lambda_d=0.25$. In this example, a signal anomaly may be determined to be present in the current frame n when spectral magnitude $X_A$ at index k of the current frame n is greater than 200% of the spectral magnitude $X_A$ at index k of the preceding frame n−1, and greater than 200% of the spectral magnitude $X_A$ at index k of the subsequent frame n+1 (e.g., Equation 4). In one embodiment, such an implementation may be referred to as a "peaking" condition or a "predetermined peaking condition." A signal anomaly may further be determined to be present in the current frame n when spectral magnitude $X_A$ at index k of the current frame n is greater than 400% of the spectral magnitude $X_A$ at index k of the preceding frame n−1 (e.g., Equation 5). In one embodiment, such an implementation may be referred to as a "step-up" condition or a "predetermined step-up condition." A signal anomaly may still further be determined to be present in the current frame n when spectral magnitude $X_A$ at index k of the current frame n is greater than 400% of the spectral magnitude $X_A$ at index k of the subsequent frame n+1 (e.g., Equation 6). In one embodiment, such an implementation may be referred to as a "step-down" condition or a "predetermined step-down condition." Other embodiments are possible.

It may be understood that Equations 4-6 enable for a determination to be made as to whether a particular frequency component at index k changes too "rapidly" or "fast" on frame-by-frame basis. In such a scenario, it may be likely that the current frame n, and associated portion of the signal x(i) as described below in connection with FIG. 2, includes high frequency transient noise, or "clicking" noise. Additionally, a "threshold" or "sensitivity" that defines whether or not the particular frequency component at index k changes too "rapidly" or "fast" may be adjusted as desired via manipulation of the scalars $\lambda_a$, $\lambda_b$, $\lambda_c$, and $\lambda_d$. Other embodiments are possible as well.

For example, any number of frames preceding or subsequent to the current frame n may be analyzed to determine whether a signal anomaly is present, or is "likely" present, in the current frame n. For example, in some embodiments, in traversing a current frame n of spectral amplitude(s), along with a preceding frame n−2 of spectral amplitude(s), and a subsequent frame n+2 of spectral amplitude(s), a comparison of respective spectral amplitudes at a particular index value k may be implemented to determine whether a signal anomaly is present in the current frame n. In this example, a signal anomaly may be determined to present in the current frame n upon satisfaction of at least one of the following conditions, presented in a mathematical form:

$$X_A[k]_{n-2}<\lambda_e X_A[k]_n \text{ and } \lambda_f X_A[k]_n>X_A[k]_{n+2} \qquad \text{Equation 7}$$

$$X_A[k]_{n-2}<\lambda_g X_A[k]_n \qquad \text{Equation 8}$$

$$X_A[k]_{n+2}<\lambda_h X_A[k]_n \qquad \text{Equation 9}$$

With reference to Equations 7-9, scalars $\lambda_e$, $\lambda_f$, $\lambda_g$, and $\lambda_h$ may have the following relationship(s): $0<\lambda_g<\lambda_e<\lambda_a$, $\lambda_a$ and $0<\lambda_h<\lambda_f<\lambda_b$; where, in one embodiment, $\lambda_e=\lambda_f=0.125$, and $\lambda_g=\lambda_h=0.0625$. In this example, a signal anomaly may be determined to be present in the current frame n when spectral magnitude $X_A$ at index k of the current frame n is greater than 800% of the spectral magnitude $X_A$ at index k of the preceding frame n−2, and greater than 800% of the spectral magnitude $X_A$ at index k of the subsequent frame n+2 (e.g., Equation 7). A signal anomaly may further be determined to be present in the current frame n when spectral magnitude $X_A$ at index k of the current frame n is greater than 1600% of the spectral magnitude $X_A$ at index k of the preceding frame n−2 (e.g., Equation 8). A signal anomaly may still further be determined to be present in the current frame n when spectral magnitude $X_A$ at index k of the current frame n is greater than 1600% of the spectral magnitude $X_A$ at index k of the subsequent frame n+2 (e.g., Equation 9). Other embodiments are possible.

As described above, a comparison of respective spectral amplitude at a particular index value k (e.g., Equations 4-9) may be implemented to determine whether a signal anomaly such as, for example, high frequency transient noise, or so-called "clicking" noise, is "likely" present or "possibly" present in the current frame n. At operation 106, particular spectral components of the current frame n may or may not be filtered based on the comparison.

For example, in instances where none of the conditions as set forth in the example Equations 4-9 are met, the spectral magnitude $X_A$ at index k of the current frame n may remain in unmodified form as $X'_A$, in accordance with an identity function of the form:

$$X'_A[k]_n = X_A[k]_n \quad \text{Equation 10}$$

However, upon satisfaction of one or more of the conditions as set forth in the example Equations 4-9, the spectral magnitude $X_A$ at index k of the current frame n may be modified in accordance with a particular signal conditioning function, as part of a signal noise reduction process according to the present disclosure. In general, the particular signal conditioning function may itself be a function of the number of frames preceding or subsequent to the current frame n that have been analyzed to determine whether a signal anomaly is present in the current frame n.

For example, in one embodiment, the spectral magnitude $X_A$ at index k of the current frame n may be modified in accordance with a signal conditioning function of the form:

$$X'_A[k]_n = \min\{X_A[k]_{n-1}, X_A[k]_{n+1}\} \quad \text{Equation 11}$$

In this example, the spectral magnitude $X_A$ at index k of the current frame n may be modified as $X'_A$ to a magnitude corresponding to the lesser of, or minimum of, the spectral magnitude $X_A$ at index k of the preceding frame n−1, and the spectral magnitude $X_A$ at index k of the subsequent frame n+1. Equation 11 corresponds to a "minimum" function, which includes arguments consistent with the number of frames preceding or subsequent to the current frame n that have been analyzed (e.g., operation 104) to determine whether a signal anomaly is present in the current frame n. In particular, Equation 11 specifies the frames n−1 and n+1, such as described above in connection with Equations 4-6.

In another example embodiment, the spectral magnitude $X_A$ at index k of the current frame n may be modified in accordance with a signal conditioning function of the form:

$$X'_A[k]_n = \min\{X_A[k]_{n-2}, X_A[k]_{n-1}, X_A[k]_{n+1}, X_A[k]_{n+2}\} \quad \text{Equation 12}$$

In this example, the spectral magnitude $X_A$ at index k of the current frame n may be modified as $X'_A$ to a magnitude corresponding to the lesser of, or minimum of, the spectral magnitude $X_A$ at index k of the preceding frame n−2, the spectral magnitude $X_A$ at index k of the preceding frame n−1, the spectral magnitude $X_A$ at index k of the subsequent frame n+1, and the spectral magnitude $X_A$ at index k of the subsequent frame n+2. Equation 12 corresponds to a "minimum" function, which includes arguments consistent with the number of frames preceding or subsequent to the current frame n that have been analyzed (e.g., operation 104) to determine whether a signal anomaly is present in the current frame n. In particular, Equation 12 specifies the frames n−1, n−2, n+1, and n+2, such as described above in connection with Equations 7-9.

In another example embodiment, the spectral magnitude $X_A$ at index k of the current frame n may be modified in accordance with a signal conditioning function of the form:

$$X'_A[k]_n = \frac{X_A[k]_{n-1} + X_A[k]_{n+1}}{2} \quad \text{Equation 13}$$

In this example, the spectral magnitude $X_A$ at index k of the current frame n may be modified as $X'_A$ to a magnitude corresponding to an arithmetic average of the spectral magnitude $X_A$ at index k of the preceding frame n−1, and the spectral magnitude $X_A$ at index k of the subsequent frame n+1. Equation 13 corresponds to an "averaging" function, which includes arguments consistent with the number of frames preceding or subsequent to the current frame n that have been analyzed (e.g., operation 104) to determine whether a signal anomaly is present in the current frame n. In particular, Equation 13 specifies the frames n−1 and n+1, such as described above in connection with Equations 4-6.

In another example embodiment, the spectral magnitude $X_A$ at index k of the current frame n may be modified in accordance with a signal conditioning function of the form:

$$X'_A[k]_n = \frac{X_A[k]_{n-2} + X_A[k]_{n-1} + X_A[k]_{n+1} + X_A[k]_{n+2}}{4} \quad \text{Equation 14}$$

In this example, the spectral magnitude $X_A$ at index k of the current frame n may be modified as $X'_A$ to a magnitude corresponding to an arithmetic average of the spectral magnitude $X_A$ at index k of the preceding frame n−2, the spectral magnitude $X_A$ at index k of the preceding frame n−1, the spectral magnitude $X_A$ at index k of the subsequent frame n+1, and the spectral magnitude $X_A$ at index k of the subsequent frame n+2. Equation 14 corresponds to an "averaging" function, which includes arguments consistent with the number of frames preceding or subsequent to the current frame n that have been analyzed (e.g., operation 104) to determine whether a signal anomaly is present in the current frame n. In particular, Equation 14 specifies the frames n−1, n−2, n+1, and n+2, such as described above in connection with Equations 7-9.

In another example embodiment, the spectral magnitude $X_A$ at index k of the current frame n may be modified in accordance with a signal conditioning function of the form:

$$X'_A[k]_n = \exp\left[\frac{\log(X_A[k]_{n-1}) + \log(X_A[k]_{n+1})}{2}\right] \quad \text{Equation 15}$$

In this example, the spectral magnitude $X_A$ at index k of the current frame n may be modified as $X'_A$ to a magnitude corresponding to a geometric average of the spectral magnitude $X_A$ at index k of the preceding frame n−1, and the spectral magnitude $X_A$ at index k of the subsequent frame n+1. Equation 15 corresponds to an "averaging" function, which includes arguments consistent with the number of frames preceding or subsequent to the current frame n that have been analyzed (e.g., operation 104) to determine whether a signal anomaly is present in the current frame n. In particular, Equation 15 specifies the frames n−1 and n+1, such as described above in connection with Equations 4-6.

In another example embodiment, the spectral magnitude $X_A$ at index k of the current frame n may be modified in accordance with a signal conditioning function of the form:

$$X'_A[k]_n = \exp\left[\frac{\log(X_A[k]_{n-2}) + \log(X_A[k]_{n-1}) + \log(X_A[k]_{n+1}) + \log(X_A[k]_{n+2})}{4}\right] \quad \text{Equation 16}$$

In this example, the spectral magnitude $X_A$ at index k of the current frame n may be modified as $X'_A$ to a magnitude corresponding to a geometric average of the spectral magnitude $X_A$ at index k of the preceding frame n−2, the spectral magnitude $X_A$ at index k of the preceding frame n−1, the spectral magnitude $X_A$ at index k of the subsequent frame n+1, and the spectral magnitude $X_A$ at index k of the subsequent frame n+2. Equation 16 corresponds to an "averaging" function, which includes arguments consistent with the number of frames preceding or subsequent to the current frame n that have been analyzed (see operation 104) to determine whether a signal anomaly is present in the current frame n. In particular, Equation 16 specifies the frames n−1, n−2, n+1, and n+2, such as described above in connection with Equations 7-9.

As described above, particular spectral components of a current frame n may or may not be filtered (e.g., Equations 10-16) based on a comparison of respective spectral amplitude magnitudes at a particular index value k (e.g., Equations 4-9). In general, such an implementation may be performed for each respective frame n of the frequency domain signal $X[k]_n$. At operation 108, upon modification (or not) of the spectral magnitude $X_A$ at index k for each respective frame n of the frequency domain signal $X[k]_n$, the frequency domain signal $X'[k]_n$ may be transformed into the time-domain according to an example N-point windowed IDFT (Inverse Discrete Fourier Transform) function of the form:

$$d[l]_n = \frac{1}{N} h(l) \sum_{k=0}^{N-1} X'[k]_n e^{j\frac{2\pi}{N}lk}, \quad l = 0, 2, \ldots, N/2 \quad \text{Equation 17}$$

In Equation 17, $d[l]_n$ may correspond to the digitized form of the repaired (or not) input audio signal x(i), where the relationship between $d[l]_n$ and an output accumulation buffer $z[l]_n$, where z[l] of the initial value n is zero (0), satisfies:

$$x'(nL+l) = \begin{cases} z[l]_n + d[l]_n, & l = 0, \ldots, N-L-1 \\ d[l]_n, & l = N-L, \ldots, L-1 \end{cases} \quad \text{Equation 18}$$

$$z[l]_{n+1} = d[l+L]_n, \quad l = 0, \ldots, N-L-1 \quad \text{Equation 19}$$

With reference to Equations 17-19, an output audio signal x'(i) may be generated by transforming the frequency domain signal $X'[k]_n$ into the time-domain. For example, referring now to FIG. 2, an unfiltered segment 202 of an audio stream sample 204 prior to signal noise reduction, along with a filtered segment 206 of the audio stream sample 204 is shown in accordance with the present disclosure.

Figure 2:
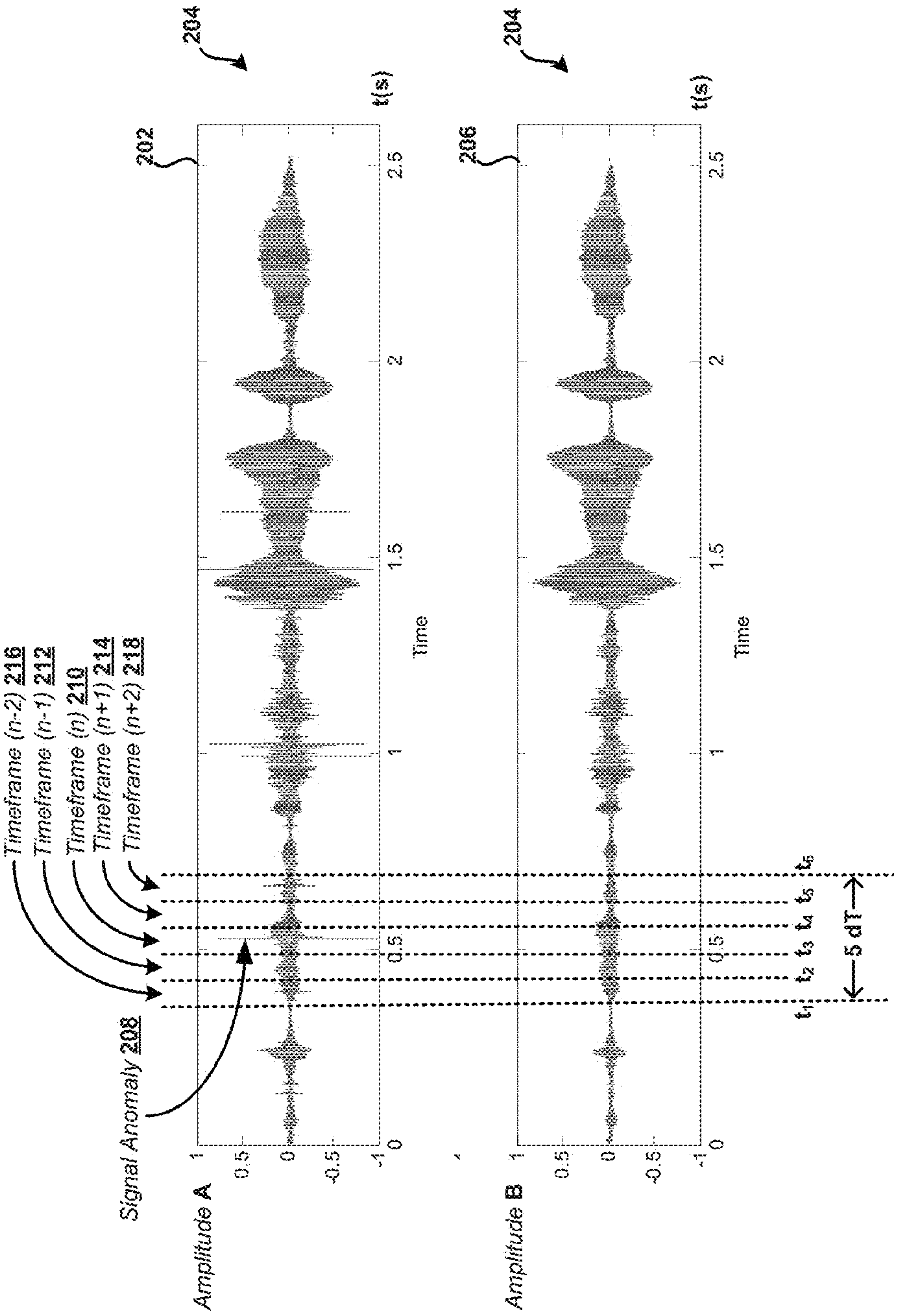
FIG. 2 shows an example segment of an example audio stream sample, and the example segment of the example audio stream sample following signal noise reduction.

In the example of FIG. 2, an amplitude A of the unfiltered segment 202 of the audio stream sample 204 is shown during an example time period t~2.5 seconds. Similarly, an amplitude B of the filtered segment 206 of the audio stream sample 204 is shown during the example time period t~2.5 seconds. A particular signal anomaly 208 of the unfiltered segment 202 is shown within a "current" timeframe (n) 210, which is associated with the "current" frame n discussed above in connection with FIG. 1.

Immediately adjacent the "current" timeframe (n) 210 is a first "preceding" timeframe (n−1) 212 and a first "subsequent" timeframe (n+1) 214. The first "preceding" timeframe (n−1) 212 is associated with the frame n−1 discussed above in connection with FIG. 1, and the first "subsequent" timeframe (n+1) 214 is associated with the frame n+1 discussed above in connection with FIG. 1. Immediately adjacent the first "preceding" timeframe (n−1) 212 is a second "preceding" timeframe (n−2) 216, and immediately adjacent the first "subsequent" timeframe (n+1) 214 is a second "subsequent" timeframe (n+2) 218. Here, the second "preceding" timeframe (n−2) 216 is associated with the frame n−2 discussed above in connection with FIG. 1, and the second "subsequent" timeframe (n+2) 218 is associated with the frame n+2 discussed above in connection with FIG. 1.

The second "preceding" timeframe (n−2) 216 is defined by an interval dT between a time $t_1$ and a time $t_2$. The first "preceding" timeframe (n−1) 212 is defined by the interval dT between the time $t_2$ and a time $t_3$. The "current" timeframe (n) 210 is defined by then interval dT between the time $t_3$ and a time $t_4$. The first "subsequent" timeframe (n+1) 214 is defined by the interval dT between the time $t_4$ and a time $t_5$. The second "subsequent" timeframe (n+2) 218 is defined by the interval dT between the time $t_5$ and a time $t_6$.

In practice, the particular signal anomaly 208 within the "current" timeframe (n) 210 of the unfiltered segment 202 of the audio stream sample 204 may be identified in a manner such as described above in connection with FIG. 1. In this example, the particular signal anomaly 208 is shown between the time $t_3$ and the time $t_4$ of the unfiltered segment 202 of the audio stream sample 204. The particular signal anomaly 208 is absent, having been removed or filtered, between the time $t_3$ and the time $t_4$ of the filtered segment 206 of the audio stream sample 204. In one embodiment, only the frequency spectra of the first "preceding" timeframe (n−1) 212 and the frequency spectra of the first "subsequent" timeframe (n+1) 214 may be analyzed to identify and filter the particular signal anomaly 208. In another embodiment, the frequency spectra of the first "preceding" timeframe (n−1) 212 and the frequency spectra of the first "subsequent" timeframe (n+1) 214, along with the frequency spectra of the second "preceding" timeframe (n−2) 216 and the second "subsequent" timeframe (n+2) 218, may be analyzed to identify and filter the particular signal anomaly 208. Still other embodiments are possible.

Figure 3:
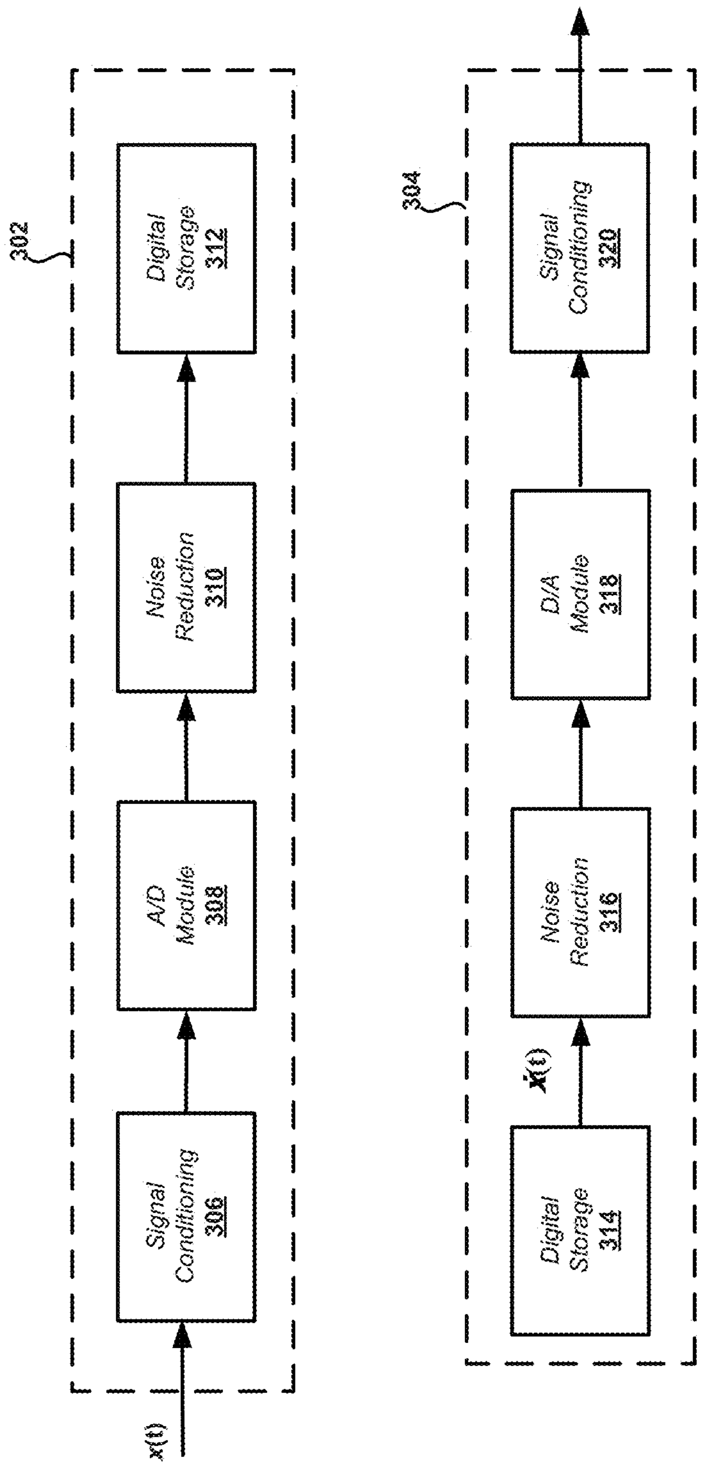
FIG. 3 shows a simplified diagram of an example audio recording stage, and an example audio playback stage.

Referring now to FIG. 3, a simplified diagram of an example audio recording stage 302, and an example audio playback stage 304, is shown in accordance with the present disclosure. In particular, the audio recording stage 302 includes a recording signal conditioning module 306, an A/D module 308, a recording noise reduction module 310, and a recording storage module 312. The audio playback stage 304 includes a playback storage module 314, a playback noise reduction module 316, a D/A module 318, and a playback signal conditioning module 320. Other embodiments of the audio recording stage 302 and the audio playback stage 304 are possible.

For example, in one embodiment, the audio recording stage 302 and the audio playback stage 304 may both be incorporated within a particular computing system or device (e.g., a server computer, laptop computer, smartphone, music player, etc.). In such a scenario, one or more or the respective modules of the audio recording stage 302 and the audio playback stage 304 may be integral with, or combined with, one or more other ones of the respective modules of the audio recording stage 302 and the audio playback stage 304. For example, the A/D module 308 and the D/A module 318, and/or the recording signal conditioning module 306 and the playback signal conditioning module 320, and/or the recording noise reduction module 310 and the playback noise reduction module 316, and/or the recording storage module 312 and the playback storage module 314 may, respectively, be incorporated into a particular module implemented wholly or in part in hardware, software, or any combination thereof. Still other embodiment are possible.

For example, the audio recording stage 302 and the audio playback stage 304 may include more or fewer modules as desired, and such a modification may or may not be implementation-specific. For example, in one embodiment, the recording signal conditioning module 306 of the audio recording stage 302, or the playback signal conditioning module 320 of the audio playback stage 304, may be omitted. In other examples, respective modules of the audio recording stage 302 and/or the audio playback stage 304 may be rearranged, as desired, and such a modification may or may not be implementation-specific. For example, in FIG. 3, the playback noise reduction module 316, the D/A module 318, and the playback signal conditioning module 320 are shown coupled in series in direction of signal flow. However, in some embodiments, these respective components may be rearranged with respect to signal flow. Still other embodiment are possible.

Referring now specifically to the audio recording stage 302, in practice, the input audio signal x(i) as discussed above in connection with FIG. 1 may be initially supplied to the recording signal conditioning module 306 for particular conditioning as desired such as, for example, amplification, filtering, converting, range matching, isolation, and others. The conditioned signal may then be passed to the A/D module 308 for conversion into a digitized version of the input audio signal x(i). The digitized version of the input audio signal x(i) may then be passed to the recording noise reduction module 310. Here, particular signal anomaly(ies) within the digitized version of the input audio signal x(i) may be identified and filtered in a manner such as described above in connection with FIGS. 1-2. Following such signal noise identification and reduction, a filtered, digital version of the input audio signal x(i) may be supplied to the recording storage module 312 for storage therein.

In some embodiments, the input audio signal x(i) may be digitized and stored within a particular memory location without prior signal noise identification and reduction as discussed throughout the present disclosure. In this example, a "post-storage" signal noise reduction may be implemented, followed by transfer of the respective noise-filtered signal for further processing, or use, as desired. For example, referring now specifically to the audio playback stage 304 of FIG. 3, in practice, a digital input audio signal $\dot{x}(i)$ may be initially supplied to the playback noise reduction module 316 from the playback storage module 314. Here, particular signal anomaly(ies) within the digital input audio signal $\dot{x}(i)$ may be identified and filtered in a manner such as described above in connection with FIGS. 1-2. The conditioned signal may then be passed to the D/A module 318 for conversion into an analog version of the input audio signal $\dot{x}(i)$. The analog version of the input audio signal $\dot{x}(i)$ may then be passed to the playback signal conditioning module 320 for particular conditioning as desired.

As mentioned above, the various aspects of the present disclosure may be applicable to any scenario in which it is desirable to implement computationally inexpensive signal processing techniques to filter undesired signal noise. Example scenarios or applications may include, among many others, simultaneous or near-simultaneous signal sharing or transmission applications (e.g., teleconferencing/videoconferencing), as well as "delayed" signal sharing or transmission applications (e.g., signal recording/playback).

Figure 4:
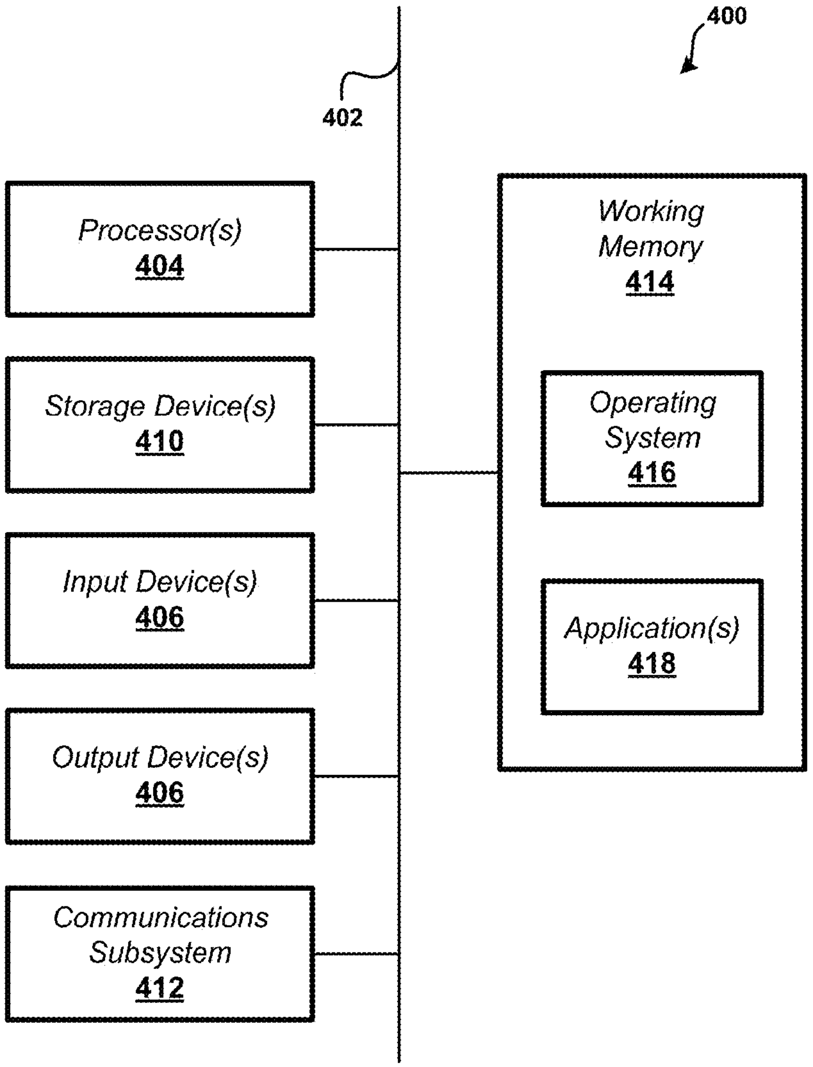
FIG. 4 shows an example computing system or device.

FIG. 4 illustrates an embodiment of an example computer system/device 400. An example of a computer device includes a mobile user equipment or terminal (e.g., smartphone), a server computer, desktop computer, laptop computer, personal data assistant, gaming console, and others. The example computer device 400 may be configured to perform and/or include instructions that, when executed, cause the computer system 400 to perform the example method of FIG. 1. It should be noted that FIG. 4 is intended only to provide a generalized illustration of various components, any or all of which may be utilized as appropriate. FIG. 4, therefore, broadly illustrates how individual system elements may be implemented in a relatively separated or relatively more integrated manner.

The computer device 400 is shown comprising hardware elements that can be electrically coupled via a bus 402 (or may otherwise be in communication, as appropriate). The hardware elements may include a processing unit with one or more processors 404, including without limitation one or more general-purpose processors and/or one or more special-purpose processors (such as digital signal processing chips, graphics acceleration processors, and/or the like); one or more input devices 406, which can include without limitation a remote control, a mouse, a keyboard, and/or the like; and one or more output devices 408, which can include without limitation a presentation device (e.g., television), a printer, and/or the like.

The computer system 400 may further include (and/or be in communication with) one or more non-transitory storage devices 410, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer device 400 might also include a communications subsystem 412, which can include without limitation a modem, a network card (wireless or wired), an infrared communication device, a wireless communication device, and/or a chipset (such as a Bluetooth™ device, an 402.11 device, a WiFi device, a WiMax device, cellular communication facilities (e.g., GSM, WCDMA, LTE, etc.), and/or the like. The communications subsystem 412 may permit data to be exchanged with a network (such as the network described below, to name one example), other computer systems, and/or any other devices described herein. In many embodiments, the computer system 400 will further comprise a working memory 414, which can include a RAM or ROM device, as described above.

The computer device 400 also can comprise software elements, shown as being currently located within the working memory 414, including an operating system 416, device drivers, executable libraries, and/or other code, such as one or more application programs 418, which may comprise computer programs provided by various embodiments, and/or may be designed to implement methods, and/or configure systems, provided by other embodiments, as described herein. Merely by way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 410 described above. In some cases, the storage medium may be incorporated within a computer system, such as computer system 400. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 400 and/or might take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 400) to perform methods in accordance with various embodiments of the invention. According to a set of embodiments, some or all of the procedures of such methods are performed by the computer system 400 in response to processor 404 executing one or more sequences of one or more instructions (which might be incorporated into the operating system 416 and/or other code, such as an application program 418) contained in the working memory 414. Such instructions may be read into the working memory 414 from another computer-readable medium, such as one or more of the storage device(s) 410. Merely by way of example, execution of the sequences of instructions contained in the working memory 414 might cause the processor(s) 404 to perform one or more procedures of the methods described herein.

The terms "machine-readable medium" and "computer-readable medium," as used herein, refer to any medium that participates in providing data that causes a machine to operate in a specific fashion. In an embodiment implemented using the computer device 400, various computer-readable media might be involved in providing instructions/code to processor(s) 404 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 410. Volatile media include, without limitation, dynamic memory, such as the working memory 414.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 404 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 412 (and/or components thereof) generally will receive signals, and the bus 402 then might carry the signals (and/or the data, instructions, etc. carried by the signals) to the working memory 414, from which the processor(s) 404 retrieves and executes the instructions. The instructions received by the working memory 414 may optionally be stored on a non-transitory storage device 410 either before or after execution by the processor(s) 404.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as any combination of: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for implementing signal noise reduction, comprising:
- receiving, at a computing system, an input digital signal that represents an audio signal;
- parsing, by the computing system, the input digital signal into a series of adjacent segments;
- converting, by the computing system, each of the adjacent segments to a frequency domain representation;
- comparing, by the computing system, a particular spectral component of a particular segment, of the series of adjacent segments, to a related spectral component of a first segment adjacent the particular segment, and to a related spectral component of a second segment adjacent the particular segment; and
- modifying, by the computing system, the particular spectral component upon a magnitude value of the particular spectral component at least one of: exceeding a particular scaled magnitude value of the related spectral component of the first segment; and exceeding a particular scaled magnitude value of the related spectral component of the second segment.

2. The method of claim 1, further comprising modifying the particular spectral component to a magnitude the lesser of a magnitude value of the related spectral component of the first segment and a magnitude value of the related spectral component of the second segment.

3. The method of claim 1, further comprising modifying the particular spectral component to a magnitude corresponding to an arithmetic average of a magnitude value of the related spectral component of the first segment and a magnitude value of the related spectral component of the second segment.

4. The method of claim 1, further comprising modifying the particular spectral component to a magnitude corresponding to a geometric average of a magnitude value of the related spectral component of the first segment and a magnitude value of the related spectral component of the second segment.

5. The method of claim 1, further comprising comparing the particular spectral component to a related spectral component of a third segment adjacent the particular segment, and to a related spectral component of a fourth segment adjacent the particular segment.

6. The method of claim 5, further comprising modifying the particular spectral component to a magnitude the lesser of a magnitude value of the related spectral component of the first segment, a magnitude value of the related spectral component of the second segment, a magnitude value of the related spectral component of the third segment, and a magnitude value of the related spectral component of the fourth segment.

7. The method of claim 5, further comprising modifying the particular spectral component to a magnitude corresponding to an arithmetic average of a magnitude value of the related spectral component of the first segment, a magnitude value of the related spectral component of the second segment, a magnitude value of the related spectral component of the third segment, and a magnitude value of the related spectral component of the fourth segment.

8. The method of claim 5, further comprising modifying the particular spectral component to a magnitude corresponding to a geometric average of a magnitude value of the related spectral component of the first segment, a magnitude value of the related spectral component of the second segment, a magnitude value of the related spectral component of the third segment, and a magnitude value of the related spectral component of the fourth segment.

9. A method for detecting signal noise, comprising:
- receiving, at a computing system, an input digital signal representing a segment of audio signals;
- converting, at the computing system, the input digital signal to a frequency domain representation, the frequency domain representation comprising a series of frames m each comprising n spectral magnitude values identified by a particular index k;
- detecting, by the computing system, a signal anomaly by determining whether a particular spectral magnitude value at a particular index of a particular frame satisfies at least one of a set conditions consisting of: (1) a predetermined peaking condition; (2) a predetermined step-up condition; and (3) a predetermined step-down condition;
- modifying, by the computing system, the particular spectral magnitude value at the particular index of the particular frame upon the particular spectral magnitude value satisfying at least one of the set of conditions; and
- converting, by the computing system, the frequency domain representation to an output digital signal.

10. The method of claim 9, wherein the segment of the audio signals are pulse-code modulated.

11. The method of claim 9, further comprising modifying the particular spectral value to a magnitude corresponding to an average value of a spectral magnitude value at related index k of a preceding frame n−1 and a spectral magnitude value at related index k of a subsequent frame n+1.

12. The method of claim 9, further comprising modifying the particular spectral value to a magnitude corresponding to the lesser of a spectral magnitude value at related index k of a preceding frame n−1 and a spectral magnitude value at related index k of a subsequent frame n+1.

13. The method of claim 9, wherein the predetermined peaking condition is determined satisfied, and a signal anomaly is detected within a current frame n, upon a spectral magnitude at index k of the current frame n being greater than a predetermined percentage value of a spectral magnitude at index k of a preceding frame n−1, and being greater than the predetermined percentage value of a spectral magnitude at index k of a subsequent frame n+1.

14. The method of claim 9, wherein the predetermined step-up condition is determined satisfied, and a signal anomaly is detected within a current frame n, upon a spectral magnitude at index k of the current frame n being greater than a predetermined percentage value of a spectral magnitude at index k of a preceding frame n−1.

15. The method of claim 9, wherein the predetermined step-down condition is determined satisfied, and a signal anomaly is detected within a current frame n, upon a spectral magnitude at index k of the current frame n being greater than a predetermined percentage value of a spectral magnitude at index k of a subsequent frame n+1.

16. A computing system, comprising:

a processing unit; and a system memory connected to the processing unit, the system memory including instructions that, when executed by the processing unit, cause the processing unit to instantiate at least one module to implement signal noise reduction, the at least one module configured to:

receive an input digital signal that represents an audio signal;

partition the input digital signal into a series of adjacent segments;

map each of the adjacent segments to a frequency domain representation;

compare a particular spectral component of a particular segment, of the series of adjacent segments, to a related spectral component of a first segment adjacent the particular segment, and to a related spectral component of a second segment adjacent the particular segment; and modify the particular spectral component upon a magnitude value of the particular spectral component at least one of: exceeding a particular scaled magnitude value of the related spectral component of the first segment; and exceeding a particular scaled magnitude value of the related spectral component of the second segment.

17. The computing system of claim 16, wherein the at least one module is further configured to modify the particular spectral component to a magnitude the lesser of a magnitude value of the related spectral component of the first segment and a magnitude value of the related spectral component of the second segment.

18. The computing system of claim 16, wherein the at least one module is further configured to modifying the particular spectral component to a magnitude corresponding to an arithmetic average of a magnitude value of the related spectral component of the first segment and a magnitude value of the related spectral component of the second segment.

19. The computing system of claim 16, wherein the at least one module is further configured to modify the particular spectral component to a magnitude corresponding to a geometric average of a magnitude value of the related spectral component of the first segment and a magnitude value of the related spectral component of the second segment.

20. The computing system of claim 16, wherein the at least one module is further configured to compare the particular spectral component to a related spectral component of a third segment adjacent the particular segment, and to a related spectral component of a fourth segment adjacent the particular segment, and modify the particular spectral component according to one of a minimum function, an arithmetic average function, and geometric average function, based on a magnitude value of the related spectral component of the first segment, a magnitude value of the related spectral component of the second segment, a magnitude value of the related spectral component of the third segment, and a magnitude value of the related spectral component of the fourth segment.

* * * * *